United States Patent [19]
Goto et al.

[11] Patent Number: 5,324,582
[45] Date of Patent: * Jun. 28, 1994

[54] MAGNETIC RECORDING MEDIUM

[75] Inventors: Narito Goto; Katsuyuki Takeda; Kunitsuna Sasaki; Nobuyuki Sekiguchi, all of Hino, Japan

[73] Assignee: Konica Corporation, Tokyo, Japan

[*] Notice: The portion of the term of this patent subsequent to May 26, 2009 has been disclaimed.

[21] Appl. No.: 59,883

[22] Filed: May 10, 1993

Related U.S. Application Data

[63] Continuation of Ser. No. 743,860, Aug. 12, 1991, abandoned.

[30] Foreign Application Priority Data

Aug. 17, 1990 [JP] Japan .................................. 2-216696
Aug. 17, 1990 [JP] Japan .................................. 2-216697

[51] Int. Cl.$^5$ .......................... B32B 5/16; G11B 5/66
[52] U.S. Cl. ................................... 428/323; 428/329; 428/336; 428/408; 428/900; 428/694 B; 428/694 BN; 428/694 BM; 428/694 SG
[58] Field of Search ............... 428/329, 336, 408, 480, 428/900, 215, 323, 694 B, 694 BN, 694 BM, 694 SG

[56] References Cited

U.S. PATENT DOCUMENTS

| | | | |
|---|---|---|---|
| 4,670,319 | 6/1987 | Katoh et al. | 428/141 |
| 4,818,581 | 4/1989 | Katoh et al. | 428/143 |
| 4,992,330 | 2/1991 | Kawahara et al. | 428/329 |
| 5,051,292 | 9/1991 | Katoh et al. | 428/141 |
| 5,051,320 | 9/1991 | Inabe et al. | 428/215 |
| 5,085,915 | 2/1992 | Taga et al. | 428/141 |
| 5,116,658 | 5/1992 | Miyake et al. | 428/141 |

Primary Examiner—Paul J. Thibodeau
Assistant Examiner—Leszek Kiliman
Attorney, Agent, or Firm—Jordan B. Bierman

[57] ABSTRACT

A magnetic recording medium having magnetic layers on the non-magnetic support. The surface of the non-magnetic support has more than 200 protrusions per mm of the measuring length having more than 0.01 μm height, and protrusions having the height more than 0.30 μm height less than 500 per 400 mm of the measuring length. The protrusions are on the surface of the magnetic layers provided or opposit side of the support or the both sides. These protrusions reduce the surface friction of the medium, resulting the better electro-magnetic properties and the longer life for repeated usages.

11 Claims, 4 Drawing Sheets

MAGNETIC RECORDING MEDIUM

This application is a continuation of application Ser. No. 07/743,860, filed Aug. 12, 1991, now abandoned.

FIELD OF THE INVENTION

The present invention relates to a magnetic recording medium such as a magnetic tape, magnetic sheet or magnetic disc.

BACKGROUND OF THE INVENTION

A magnetic recording medium such as a magnetic tape is usually produced by coating and drying on a support a magnetic coating solution comprising a magnetic powder, a binder resin and other components. In the conventional magnetic recording media, it is necessary to cover a broad frequency band from low to high frequencies with only one kind of magnetic powder since they have only one magnetic layer. Particularly, to meet the requirement for a combination of improved recording performance at high frequencies and reduced noise in relation to the recent tendency toward higher recording density, there have been used magnetic powders having a high Hc value and a high BET value.

However, since the conventional magnetic recording media comprise only one kind of magnetic powder (magnetic layer), a magnetic powder having a high Hc value and a high BET value must be used to obtain the desired performance at high frequencies, which results in unsatisfactory performance at low frequencies.

On the other hand, there have been proposed magnetic recording media for video tapes having a plurality of magnetic layers to improve the magnetic recording capacity or to improve the magnetic recording properties at both high and low frequencies with a good balance, such as those disclosed in Japanese Patent O.P.I. Publication Nos. 98803/1973, 172142/1984, 64901/1976, 56228/1983 and 146211/1988 and Japanese Patent Examined Publication Nos. 2218/1957 and 12937/1981.

In these known methods, the magnetic recording medium is designed to assign the task of video output to an upper magnetic layer incorporating a magnetic powder comprising relatively fine grains and the task of chromatic and audio output to a lower magnetic layer incorporating a magnetic powder comprising larger grains.

Meanwhile, Japanese Patent O.P.I. Publication No. 61230/1986 describes the use of Co-containing $\gamma$-$Fe_2O_3$ which contains a divalent iron component ($Fe^{2+}$) at 3.5 to 10% by weight as FeO and at 0.04 to 0.123 (4 to 12.3%) by $Fe^{2+}/Fe^{3+}$ ratio as a magnetic material (magnetic powder) contained in the magnetic layer. Also, Japanese Patent O.P.I. Publication Nos. 19524/1989, 86321/1989, 13225/1989 and 300425/1988 describe the use of $FeOx$ ($1.33 \leq x \leq 1.50$) as a magnetic powder.

As a magnetic powder material, Co-containing iron oxide having a higher $Fe^{2+}/Fe^{3+}$ ratio of 0.13 to 0.45 in comparison with Co-$\gamma$-$Fe_2O_3$ having an $Fe^{2+}/Fe^{3+}$ ratio of 0.001 to 0.1 is designated as of the magnetite type ($Fe_3O_4$), comprising FeO and $Fe_2O_3$. Such Co-containing iron oxide of the magnetite type possesses excellent properties; for example, its black color offers good masking and thus ensures a satisfactory light transmittance even with a reduced amount of carbon black added to the magnetic recording medium, easy electron exchange between $Fe^{2+}$ and $Fe^{3+}$ reduces the surface resistivity of the magnetic layer and the coercive force Hc has a value favorable for chromatic output and other aspects. However, it is preferable to reduce the amount of carbon black and minimize its content particularly in the outermost layer to improve the electromagnetic conversion properties.

Japanese Patent O.P.I. Publication No. 187418/1988 discloses a method in which a plurality of layers are formed on a support wherein at least one lower layer comprising a non-magnetic powder such as carbon black dispersed in a binder is formed below an upper magnetic layer.

Concerning the prior art methods in which a plurality of layers are formed on a support, it is a well-known fact that carbon black etc. are removed from the outermost layer to improve the electromagnetic conversion properties and a lower layer or back-coating layer incorporating carbon black etc. is used to meet the requirement for light transmittance. On the other hand, the use of a plurality of magnetic layers incorporating a magnetic powder having a high $Fe^{2+}/Fe^{3+}$ ratio offers solutions to the problems in light transmittance and electro-conductivity, but a back-coating layer increases its importance to obtain satisfactory running durability as the magnetic layers become more smooth.

SUMMARY OF THE INVENTION

It is an object of the present invention to provide a magnetic recording medium having a plurality of layers which ensures satisfactory running durability and which offers a well-balanced combination of high levels of electromagnetic conversion properties and running durability.

Accordingly, the present invention relates to a magnetic recording medium comprising at least two layers formed on the same side of a non-magnetic support, of which layers the outermost layer is a magnetic layer containing a magnetic powder and at least one of two surfaces of the support has thereon protrusions, wherein the number of protrusions of not less than 0.01 $\mu$m in height is not less than 200 per mm of measuring length, the number of protrusions of not less than 0.30 $\mu$m in height is not more than 500 per 400 mm of measuring length and the ratio of the maximum height of protrusions and the average height of protrusions (maximum protrusion height/average protrusion height) is not more than 5.

DETAILED DESCRIPTION OF THE INVENTION

Figure 1:
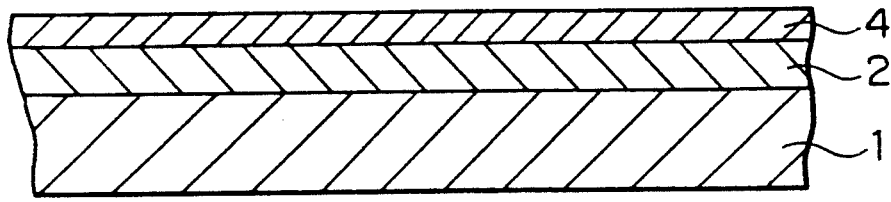
FIGS. 1, 2 and 4 through 6 illustrate the present invention by means of cross-sectional views of five modes of the magnetic recording medium of the invention.

At first, the case where the layers other than the outermost layer contains carbon black as the main filler is described in detail, since the outermost layer of the layers on the non-magnetic support is a magnetic layer and since at least one layer other than the outermost layer contains carbon black as the main filler, the carbon black offers satisfactory masking for the magnetic recording medium by meeting the requirement for light transmittance and the amount of carbon black used in the magnetic layer can be minimized, which in turn offers a significant improvement in the electromagnetic conversion properties and ensures satisfactory running durability. In this case, by forming an additional layer according to the present invention, which contains carbon black as the main filler, below the latter layer, or by adding carbon black as the main filler to the latter magnetic layer, the amount of carbon black added to the outermost magnetic layer can be decreased than that in the layer containing carbon black as the main filler, which permits improvements in the output properties at high frequencies for the outermost layer and improvements in the output properties at moderate to low frequencies for a magnetic layer other than the outermost layer. The capability thus obtained is of great importance in that it offers a well-balanced combination of satisfactory levels of electromagnetic conversion properties and durability as required in relation to the requirement for reduced thickness and high density packing for the outermost layer. In other words, as the amount of carbon black added to the outermost layer is decreased to improve the electromagnetic conversion properties, the running property of the magnetic recording medium is degraded because of an increase in the coefficient of friction, but this degraded running property can be improved by means of the protrusions on the support's opposite face described above.

In the present invention, "being the main filler" in the layer containing carbon black as the main filler means that carbon black accounts for preferably 10 to 80 parts by weight of 100 parts by weight of the total amount of the components of the layer, with more preference given to 30 to 60 parts by weight of carbon black. Too small an amount does not offer a satisfactory masking effect, while too large an amount results in poor layer strength or adhesion. The average grain size of carbon black is preferably 10 to 100 m$\mu$, more preferably 20 to 80 m$\mu$.

Carbon black for masking can be used, which permits an increase in the degree of light masking. Examples of commercially available carbon black for masking include Columbian Carbon Raven 2000 (specific surface area 190 m$^2$/g, grain size 180 m$\mu$), 2100, 1170 and 1000, Mitsubishi Chemical #100, #75, #40, #35 and #30.

Examples of electro-conductive carbon black include Columbian Carbon Conductex 975 [BET value (hereinafter abbreviated BET) 250 m$^2$/g, DBP oil absorption rate (hereinafter abbreviated DBP) 170 ml/100 g, grain size 24 m$\mu$], Conductex 900 (BET 125 m$^2$/g, grain size 27 m$\mu$), Conductex 40-220 (grain size 20 m$\mu$), Conductex SC (BET 220 m$^2$/g, DBP 115 ml/100 g, grain size 20 m$\mu$), Cabot Vulcan XC-72 (specific surface area 254 m$^2$/g, grain size 30 m$\mu$), Vulcan P (BET 143 m$^2$/g, DBP 118 ml/100 g, grain size 20 m$\mu$), Raven 1040 and 420, Black Pearls 2000 (grain size 15 m$\mu$) and Mitsubishi Chemical #44.

Examples of other carbon black products useable for the present invention include Columbian Carbon Conductex SC (BET of 220 m$^2$/g, DBP 115 ml/100 g, grain size 20 m$\mu$), Cabot Vulcan 9 (BET 140 m$^2$/g, DPB 114 ml/100 g, grain size 19 m$\mu$), Asahi Carbon #80 (BET 117 m$^2$/g, DBP 113 ml/100 g, grain size 23 m$\mu$), Denki Kagaku HS100 (BET 32 m$^2$/g, DBP 180 ml/100 g, grain size 53 m$\mu$), Mitsubishi Chemical #22B (BET 55 m$^2$/g, DBP 131 ml/100 g, grain size 40 m$\mu$), #20B (BET 56 m$^2$/g, DBP 115 ml/100 g, grain size 40 m$\mu$) and #3500 (BET 47 m$^2$/g, DBP 187 ml/100 g, grain size 40 m$\mu$), as well as Mitsubishi Chemical CF-9, #4000, MA-600, Cabot Black Pearls L, Monarch 800, Black Pearls 700, Black Pearls 1000, Black Peals 880, Black Pearls 900, Black Pearls 1300, Black Pearls 2000, Sterling V, Columbian Carbon Raven 410, Raven 3200, Raven 430, Raven 450, Raven 825, Raven 1255, Raven 1035, Raven 1000, Raven 5000 and *Ketchen Black FC*.

The thickness of the outermost magnetic layer of the present invention is preferably not more than 1.0 $\mu$m, more preferably 0.1 to 1.0 $\mu$m, and still more preferably 0.1 to 0.7 $\mu$m. The thickness of the lower layer under the outermost layer is preferably 0.1 to 4.0 $\mu$m, more preferably 0.3 to 3.0 $\mu$m.

In the present invention, it is desirable that the magnetic layers (the outermost layer and other layers) be adjacent to each other. It should be noted, however, that a clear boundary is substantially present between two adjoining layers in some cases but a boundary region in which the magnetic powders of the two layers coexists at a given thickness in other cases, and such a boundary region is not included in the upper or lower layers. The magnetic recording medium of the present invention works well when the magnetic layers are coated by the wet-on-wet method. The wet-on-dry method is of course available, in which an upper layer is coated after drying a lower layer.

In the present invention, since protrusions according to the invention are formed on the non-magnetic support's face opposite to the magnetic layer side while maintaining the unique features of a magnetic recording medium having a plurality of layers, the coefficient of friction on the back face of the support is sufficiently low to ensure very good running of the magnetic recording medium against guides etc. even in the absence of a back-coating layer.

Accordingly, by making the average height of protrusions on the opposite face (H) to be not less than 0.01 $\mu$m, snaking and sticking in the magnetic layer coating process and calendering process are prevented to improve the running property and improves the durability. By making the average height of protrusions on the opposite face (H) to be not more than 0.20 $\mu$m, the surface undulation on the magnetic layer is reduced to improve the electromagnetic conversion properties. In other words, if the average height of protrusions on the-face opposite to the magnetic layer side (H) exceeds 0.20 $\mu$m, transfer to the magnetic layer occurs, which results in increased surface undulation on the magnetic layer, thus degrading the electromagnetic conversion properties. The average height of protrusions (H) is preferably 0.02 to 0.15 $\mu$m, and more preferably 0.05 to 0.1 $\mu$m.

With respect to the non-magnetic support for the present invention, it is essential that the number of protrusions having a height of not less than 0.01 $\mu$m on the opposite face is not less than 200 per mm of measuring length (preferably not less than 200 and not more than 2000), the number of protrusions having a height of not less than 0.30 $\mu$m on the opposite face is not more than 500 per 400 mm of measuring length (preferably not more than 100) and the ratio of (maximum protrusion height/average protrusion height) on the opposite face is not more than 5 (preferably not more than 3).

By making the number of protrusions having a height of not less than 0.01 μm on the opposite face to be not less than 200 per mm of measuring length, it is possible to provide a magnetic recording medium which is excellent in running property, which is not sensitive to scratches and which has improved durability. By making the number of protrusions having a height of not less than 0.30 μm on the opposite face to be not more than 500 per 400 mm of measuring length, it is possible to reduce the surface undulation of the magnetic layer to improve the electromagnetic conversion properties. By making the ratio of (maximum protrusion height/average protrusion height) on the opposite face to be not more than 5, it is possible to improve the running property and durability without being accompanied by degradation of the improved electromagnetic conversion properties.

The protrusions on the opposite face of the non-magnetic support can be formed as follows: For example, as described in Japanese Patent O.P.I. Publication No. 14126/1990, a protrusion layer which comprises inert grains such as silica grains or Q-alumina grains having as uniform as possible a grain size and as spherical as possible a shape at 0.1 to 10% by weight, preferably 0.1 to 5% by weight and which has an average thickness of 0.01 to 1 μm, preferably 0.01 to 0.5 μm, is formed on the smooth, undulation-free opposite face of the non-magnetic support. Here, the protrusion layer does not need to form a film, as long as the grains are coated with polymer; for example, it may be in a net-like shape. The protrusions can also be formed by mechanically forming ruggedness on the opposite face of the non-magnetic support rather than by forming a protrusion layer as described above. Another method of controlling the number of protrusions is to vary the amount or grain size distribution of the filler contained in the base non-magnetic support.

Second, the case where the layers other than the outermost layer contains ferromagnetic particles is described in detail, the distribution and size of protrusions on the opposite side is important particularly in a magnetic recording medium which has a plurality of magnetic layers and which possesses improved frequency characteristics over the entire frequency range like the present invention. Specifically, with respect to the uppermost magnetic layer, which incorporates fine grains of magnetic powder packed at high density and which needs to possess excellent durability, its film quality and surface properties can be improved to improve the electromagnetic conversion properties because the coatability and running property of the magnetic layer are improved and the surface undulation is reduced as stated above. In addition, the surface of the magnetic layer remains intact from flaws due to transfer from the back face, which results in a significant improvement in the durability of the outermost layer. Also, reducing the surface undulation on the magnetic layer results in improvements in the electromagnetic conversion properties such as chromatic S/N.

Third, another preferable embodiment of the invention is that protrusions according to the invention are formed on the non-magnetic support's face same to the magnetic layer side. As the result of that, not only running property and durability can be improved but also rubbing noise and head stain can be minimized.

Fourth, by making a magnetic recording medium, where protrusions according to the invention are formed on the both sides of the support surfaces, weaving and sticking of a recording medium can be prevented in the coating and calendering step, so that a running property and a durability can be improved. Rubbing noise and head stain can also be minimized.

Chromatic properties are further improved by selecting an appropriate magnetic material for a magnetic layer other than the outermost layer. It is preferable that at least one magnetic layer other than the outermost layer or the outermost layer contain a iron oxide magnetic material such as Co-containing iron oxide, particularly an iron oxide wherein the ratio of the divalent iron component ($Fe^{2+}$) and the trivalent iron component ($Fe^{3+}$) is not less than 0.10. Particularly, iron oxide magnetic powder of the magnetite type ($0.13 \leq Fe^{2+} \leq 0.45$) is preferred. Such iron oxide makes it possible to reduce the amount of carbon black added to the structural layers of the magnetic recording medium or makes it unnecessary to use carbon black since it offers satisfactory masking for the magnetic layer and reduces the surface resistivity. For example, a reduction in the amount of carbon black added to the magnetic layer leads to an improvement in the electromagnetic conversion properties. In addition, it becomes unnecessary to give masking by controlling the amount of carbon black added to the back-coating layer as in conventional methods, and even the back-coating layer itself can be eliminated.

Controlling the ratio of $Fe^{2+}$ in the magnetic material can be achieved by controlled oxidation with the burning temperature and time changed during formation of oxide.

Figure 2:
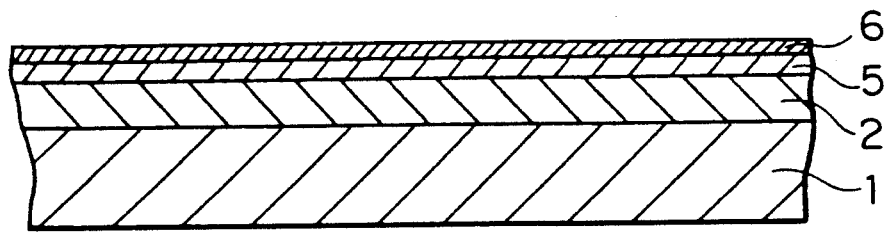

A mode of the magnetic recording medium of the present invention comprises a non-magnetic support 1, made of polyethylene terephthalate etc., and a first magnetic layer 2 and a second magnetic layer 4, formed on the non-magnetic support in this order. No back-coating layer is formed on the support's face opposite to the lamination face, which opposite face is provided with uniformly formed protrusions having a distribution and size according to the present invention. An over-coating layer may be formed on the second magnetic layer. In the mode of FIG. 2, the upper layer is divided into two sublayers 5 and 6.

With respect to the magnetic recording media illustrated in FIGS. 1 and 2, the thickness of the first magnetic layer 2 is preferably 0.1 to 4.0 μm, more preferably 0.3 to 3.0 μm, and still more preferably 2.0 to 3.5 μm. The thickness of the second magnetic layer 4 or the total thickness of the second and third magnetic layers 5 and 6 is preferably not more than 1.0 μm, more preferably 0.1 to 0.7 μm.

Figure 4:
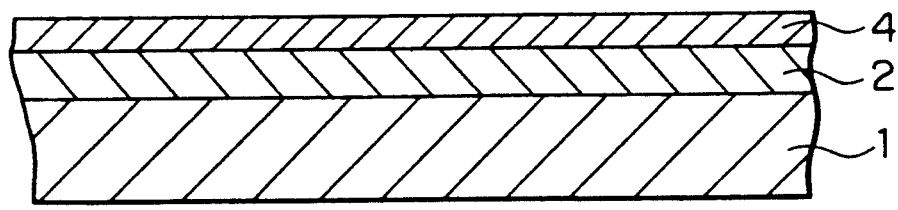
Figure 5:
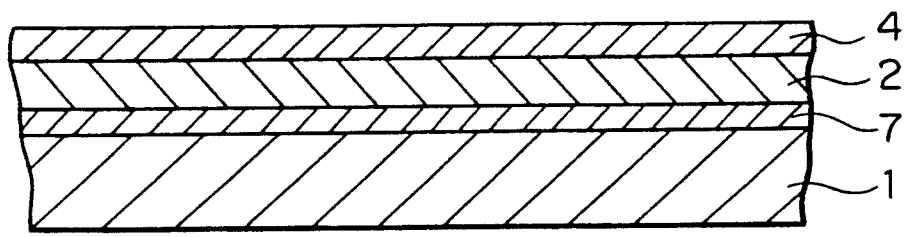
Figure 6:
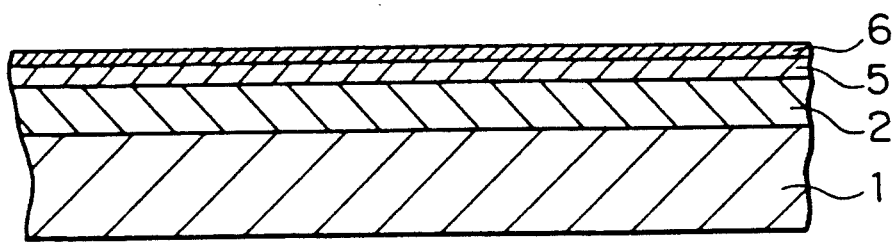

In the mode of FIG. 4, layer 2 is a layer containing carbon black as the main filler according to the present invention, which layer may be a magnetic layer. In the mode of FIG. 4, layer 4 is a magnetic layer. No back-coating layer is formed on the support's face opposite to the lamination face, which opposite face is provided with uniformly formed protrusions having a distribution and size according to the present invention. An over-coating layer may be formed on the magnetic layer in the mode of FIG. 4. In the mode of FIG. 5, the layer 2 is a magnetic layer, and a layer 7 containing carbon black as the main filler is formed thereunder. In the mode of FIG. 6, the upper layer of FIG. 4 is divided into sublayers 5 and 6. In the mode of FIG. 5, the layer 2 may also contain carbon black as the main filler. In the mode of FIG. 6, the layer 2 (and also the layer 5) may contain carbon black as the main filler.

With respect to the magnetic recording media illustrated in FIGS. 4 through 6, the thickness of the layer 2 in the mode of FIG. 4 or layer 7 in the mode of FIG. 5 is preferably 0.1 to 4.0 μm, such as 2.0 μm. The thickness of the layer 4 in the mode of FIG. 5 or the total thickness of the fifth and sixth layers 5 and 6 is preferably not more than 1.0 μm, such as 0.7 μm.

The magnetic layers 2, 4, 5 and 6 shown in FIGS. 1 and 2 may contain a magnetic powder. Examples of the magnetic powder used in the magnetic layer 2 or 4 or the magnetic layer 5, 2 or 6 include magnetic powders of iron oxide such as Co-containing iron oxide ($Fe^{2+}/Fe^{3+} \leq 0.10$) powder, $\gamma$-$Fe_2O_3$ powder and various ferromagnetic powders of metals or alloys based on Fe, Ni, Co or other metals, such as Fe powder, Ni powder and Co powder, Fe-Ni-Co alloy powder, Fe-Ni alloy powder, Fe-Al alloy powder, Fe-Al-Ca alloy powder, Fe-Al-Ni alloy powder, Fe-Al-Co alloy powder, Fe-Mn-Zn alloy powder, Fe-Ni-Zn alloy powder, Fe-Al-Ni-Co alloy powder, Fe-Al-Ni-Cr alloy powder, Fe-Al-Co-Cr alloy powder, Fe-Co-Ni-Cr alloy powder, Fe-Co-Ni-P alloy powder and Co-Ni alloy powder and hexagonal ferrite. With respect to the outermost magnetic layers 4 and 6 and the other magnetic layers 2, 5 and/or 2, the former 4 and 6 are designated as the uppermost layers, and the latter 2, 5 or 5 and 2 are designated as lower layers.

Of these magnetic powders, those suitable to the magnetic layers may be selected. By adding a Co-containing iron oxide having an $Fe^{2+}/Fe^{3+}$ ratio of not less than 0.10 to at least one lower magnetic layer, the amount of carbon black can be reduced since the Co-containing iron oxide is black. Although the running property worsens, it is improved by the protrusion properties on the back face of the support.

Magnetic layers may each contain a lubricant such as silicone oil, graphite, molybdenum disulfide, tungsten disulfide, a monobasic fatty acid having a carbon number of 12 to 20 such as stearic acid or a fatty acid ester having a total carbon number of 13 to 40, an abrasive such as fused alumina, an antistatic agent such as carbon black or graphite, a dispersing agent such as powdered lecithin and other additives.

The binders which can be used in the magnetic layers 2, 4, 5 and 6 and the layer containing carbon black as the main filler preferably has an average molecular weight of about 10000 to 200000. Examples of such binders include vinyl chloride-vinyl acetate copolymer, vinyl chloride-vinylidene chloride copolymer, vinyl chloride-acrylonitrile copolymer, polyvinyl chloride, urethane resin, butadiene-acrylonitrile copolymer, polyamide resin, polyvinyl butyral, cellulose derivatives such as cellulose acetate, cellulose diacetate, cellulose triacetate, cellulose propionate and nitrocellulose, stryene-butadiene copolymer, polyester resin, various synthetic rubbers, phenol resin, epoxy resin, urea resin, melamine resin, phenoxy resin, silicon resin, acrylic reactive resin, high molecular polyester resin-isocyanate prepolymer mixture, polyester polyol-polyisocyanate mixture, urea-formaldehyde resin, low molecular glycol/high molecular diol/isocyanate mixture and mixtures thereof.

The binder is preferably a resin having a hydrophilic functional group such as $-SO_3M$, $-COOM$, $-PO(OM')_2$ wherein M represents hydrogen or an alkali metal such as lithium, potassium or sodium, and M' represents hydrogen or an alkali metal such as lithium, potassium or sodium or a hydrocarbon residue. In other words, such a resin offers an improvement in the compatibility with magnetic powder by the action of the functional group in the molecule, which leads to a further improvement in the dispersibility of the magnetic powder and prevents the aggregation of the magnetic powder to further improve the coating solution stability, which in turn improves the durability of the magnetic recording medium.

Such a binder, particularly a vinyl chloride copolymer can be obtained by copolymerizing a vinyl chloride monomer and a copolymerizable monomer containing a$_n$ alkali salt of sulfonic acid, carboxylic acid or phosphoric acid and another copolymerizable monomer added as necessary. Since this copolymer is easy to synthesize because vinyl synthesis is available, and various copolymer components can be selected to obtain optimized copolymer properties.

The metal for the salts of sulfonic acid, carboxylic acid or phosphoric acid is an alkali metal such as sodium, potassium or lithium, with preference given to potassium from the viewpoint of solubility, reactivity, yield and other aspects.

Examples of the material for the support 1 include plastics such as polyethylene terephthalate and polypropylene, metals such as aluminum and zinc, and ceramics such as glass, BN, Si carbide, porcelain and china. The thickness of the non-magnetic support is normally 3 to 150 μm, preferably 4 to 100 μm for a tape or sheet form, and normally 30 to 100 μm for a disc or card form. In the case of a drum form, the non-magnetic support may be prepared to have a form according to the recorder used, such as a cylinder.

Figure 3:
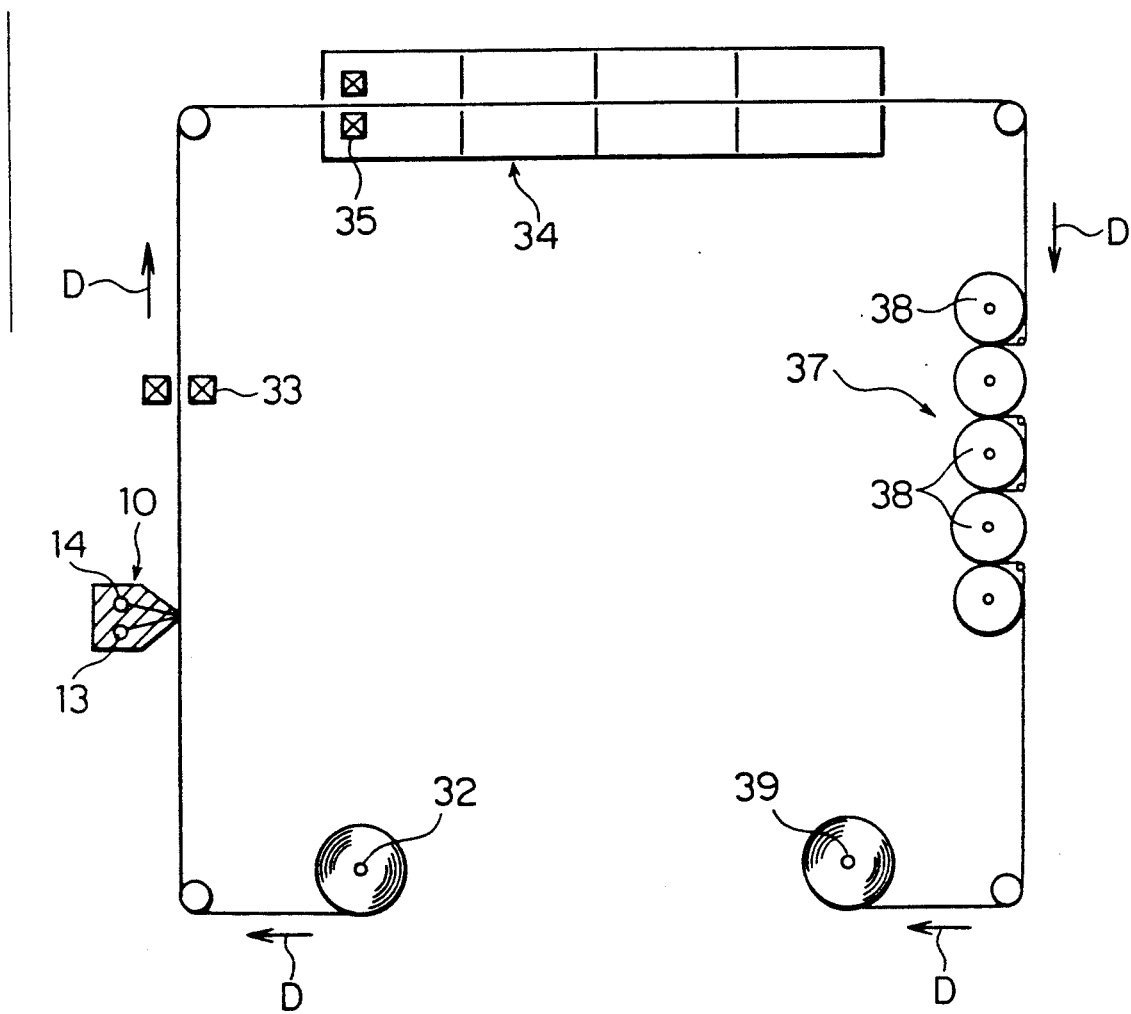
FIG. 3 is a schematic view of a production apparatus for a magnetic recording medium.

An example of the production apparatus for the magnetic recording medium is shown in FIG. 3.

In producing the magnetic recording medium of FIG. 1 with this production apparatus, the film-like support 1 provided with protrusions of the invention on the back face is supplied from the supply roll 32 and coated with the coating solutions for magnetic layers 2 and 4 by the extrusion coater 10, after which it is oriented by a first stage orientation magnet 33 of 2000 Gauss and then introduced into a drier 34 equipped with a second stage orientation magnet 35 of 2000 Gauss, where it is dried by hot blow from the upper and lower nozzles. Then, the dried support 1, with layers coated, is introduced into a super-calenderer 37 comprising a combination of calender rolls 38, where it is calendered, after which it is wound up on a winding roll 39. Each coating solution may be supplied to the extrusion coaxer 10 via an in-line mixer (not illustrated). In the figures, the arrow D shows the direction of transport of the non-magnetic base film. The extrusion coater 10, equipped with coating solution reservoirs 13 and 14, coat the coating solutions from respective reservoirs by the wet-on-wet method. To produce the magnetic recording medium of FIG. 2, one more coater or discharge port is added to the apparatus of FIG. 3.

EXAMPLES

The present invention is hereinafter described in more detail by means of the following examples.

The components, ratios, orders of operation and other features shown below are variable, as long as the scope of the invention is not deviated from. "Part(s)" means part(s) by weight without exception.

Example 1

| Preparation of upper layer coating solution | |
| --- | --- |
| Ferromagnetic powder, listed in the following Table 2 | 100 parts |
| Vinyl chloride resin containing potassium sulfonate (commercially available under trade name MR110, produced by Nippon Zeon) | 10 parts |
| Polyurethane containing sodium sulfonate (commercially available under trade name UR-8300, produced by Toyobo Ltd.) | 5 parts |
| Alumina having an average grain size of 0.2 μm | 5 parts |
| Carbon black | 1 part |
| Myristic acid | 1 part |
| Stearic acid | 1 part |
| Butyl stearate | 1 part |
| Methyl ethyl ketone | 100 parts |
| Cyclohexanone | 100 parts |
| Toluene | 100 parts |

Preparation of lower layer coating solution

A coating solution was prepared in the same manner as with the upper layer coating solution except that a Co-containing iron oxide having a BET of 30 m²/g, an Hc of 650 Oe and an $Fe^{2+}/Fe^{3+}$ ratio listed in the following Table 3 was used.

A kneader and a sand mill were used to prepare magnetic coating solutions with the compositions shown above. To each resulting dispersion was added 5 parts of a polyisocyanate compound commercially available under trade name Coronate 3041L, produced by Nippon Polyurethane Industry Co., Ltd. and they were mixed in to prepare a magnetic coating solution. An extrusion coater was used to coat an upper layer and a lower layer on the support by the wet-on-wet method (the apparatus used is illustrated in FIG. 3).

The support was a polyethylene terephthalate base film having a thickness of 10 μm, having protrusions on the back face whose height and number are shown in the following Table 1. The support was prepared by forming a polyester layer based mainly on ethylene naphthalate or ethylene α, β-bis(2-chlorophenoxy)ethane-4,4'-dicarboxylate on the base film to a thickness of 0.01 to 2.5 μ by a known method. The height, size and number of the protrusions on the surface of the support were controlled by adjusting the grain size, grain size distribution, type, content and other features of the inert grains (silica grains) in the polyester layer.

Coating was followed by orientation, drying and calendering. The production conditions for the magnetic recording medium are shown in Table 2.

The wide magnetic film thus obtained was wound up, and cut to have a width shown in Table 2 to yield a video tape.

Its performance was evaluated as directed below. The results are shown in Table 3.

RF output, luminescent S/N, chromatic output, chromatic S/N

Determined using a Shibasoku 925 D/1 color video noise meter on V-900, produced by SONY, for the 8 mm tape and on HR-S7000, produced by Victor Company of Japan, for the ½ inch tape. Results are expressed in values relative to the figures obtained with the reference tape in dB unit. The frequencies of the respective signals are as follows:

RF-output and luminescent S/N: 7 MHz (8 mm), 6 MHz (½ inch)

Chromatic output and chromatic S/N: 743 KHz (8 mm), 629 KHz (½ inch)

Number and height of protrusions on the non-magnetic support's face opposite to the magnetic layer side A surface roughness curve was drawn using a taly step surface roughness tester, produced by *Tailor-Hobson*. With respect to the protrusions recognized with this curve as a peak (protrusions exceeding the peak count value), the height from the average line was measured, and the protrusions having a thus-measured height of not less than 0.010 μm and those having a height of not less than 0.30 μm were counted under the following conditions:

| Measuring length: | 1 mm |
| --- | --- |
| Cutoff value: (high pass filter) | 0.33 Hz |
| Peak count value: | 0.005 μm |

For the protrusions having a height of not less than 0.30 μm, their number was obtained per 400 cycles of the measurement described above since the frequency of their occurrence was low.

Running property

Full-length running on an EV-S1 deck (8 mm tape), produced by SONY, and on an HR-S7000 deck (½ inch tape), produced by Victor Company of Japan, was carried out at a temperature of 40° C. and a humidity of 80% for 100 hours, after which the tape sample was evaluated with respect to tape edge damage in the following three grades.

○: No edge damage.
Δ: Edge damage localized in the tape.
x: Edge damage over the entire tape.

Scratches on the non-magnetic support's back face

The sample was subjected to 400 cycles of run on an EV-S1 deck (8 mm tape), produced by SONY, and on an HR-S7000 deck (½ inch tape), produced by Victor Company of Japan, after which the back face was examined for flaws and evaluated in the following four grades.

A: No scratches on the back face.
B: A small number of scratches on the back face, but no problem.
C: A large number of scratches on the back face, but the reproduced image quality not affected.
D: A large number of scratches on the back, with noise occurring in the reproduced images.

Light transmittance

The light transmittance at a wavelength of 900 nm was determined.

Surface resistivity

Figure 7:
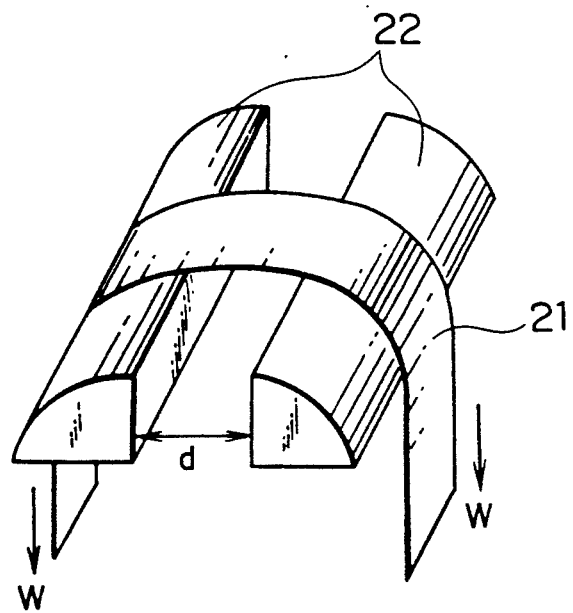
FIG. 7 is a chart illustrating the measurement of surface resistivity. The symbols used in these figures respectively denote a non-magnetic support for 1, a lower magnetic layer for 2 and 7, an upper magnetic layer for 4 and 6 and an intermediate magnetic layer for 5.

As illustrated in FIG. 7, two rod-like metallic electrodes 22 having a cross section of a quarter circle of about 1 cm in radius were placed apart from each other at a distance d of 12.7 mm. A tape 21 was placed on these electrodes at a right angle with the magnetic surface kept in contact therewith, and a 160 g weight was suspended from each end of the tape. A measuring voltage of DC 500±50 V was applied to these electrodes, and the resistivity was measured using an insulation resistance tester for the surface resistivity. Measurements were made after the sample was kept standing at a relative humidity of 30% for 24 hours.

TABLE 1

| | Number of protrusions having a height of not less than 0.01 μm (per mm) | Average height of protrusions (μm) | Maximum height of protrusions (μm) | Maximum height of protrusions/ average height of protrusions | Number of protrusions having a height of not less than 0.30 μm (per 400 mm) |
|---|---|---|---|---|---|
| Examples 1, 6 through 12, Comparative Examples 10 through 12 | 475 | 0.090 | 0.225 | 2.5 | 0 |
| Example 2 | 625 | 0.045 | 0.20 | 4.4 | 0 |
| Example 3 | 250 | 0.090 | 0.20 | 2.2 | 0 |
| Example 4 | 250 | 0.155 | 0.25 | 1.6 | 0 |
| Example 5 | 500 | 0.091 | 0.40 | 4.4 | 450 |
| Example 13 | 200 | 0.090 | 0.20 | 2.2 | 0 |
| Example 14 | 475 | 0.200 | 0.25 | 1.25 | 0 |
| Example 15 | 475 | 0.090 | 0.45 | 5.0 | 0 |
| Example 16 | 475 | 0.091 | 0.40 | 4.4 | 500 |
| Comparative Examples 1, 5 through 9 | 150 | 0.090 | 0.225 | 2.5 | 0 |
| Comparative Examples 2 | 200 | 0.221 | 0.28 | 1.3 | 0 |
| Comparative Examples 3 | 400 | 0.090 | 0.55 | 5.6 | 520 |
| Comparative Examples 4 | 475 | 0.090 | 0.55 | 5.6 | 1520 |
| Comparative Examples 13 | 180 | 0.090 | 0.225 | 2.5 | 0 |
| Comparative Examples 14 | 400 | 0.210 | 0.28 | 1.3 | 0 |

TABLE 2

| | Magnetic material for upper layer | Presence or absence of lower layer | Upper layer thickness (μm) | Lower layer thickness (μm) | Cutting width |
|---|---|---|---|---|---|
| Examples 1 through 8, 11 and 12 | (I) | Yes | 0.5 | 2.5 | 8 mm |
| Example 9 | (II) | Yes | 0.5 | 2.5 | ½ inch |
| Example 10 | (III) | Yes | 0.5 | 2.5 | ½ inch |
| Examples 13 through 16 | (I) | Yes | 0.5 | 2.5 | 8 mm |
| Comparative Examples 1 through 4 | (I) | Yes | 0.5 | 2.5 | 8 mm |
| Comparative Example 5 | (II) | Yes | 0.5 | 2.5 | ½ inch |
| Comparative Example 6 | (III) | Yes | 0.5 | 2.5 | ½ inch |
| Comparative Examples 7 and 10 | (I) | No | 3.0 | — | 8 mm |
| Comparative Examples 8 and 11 | (II) | No | 3.0 | — | ½ inch |
| Comparative Examples 9 and 12 | (III) | No | 3.0 | — | ½ inch |
| Comparative Examples 13 and 14 | (I) | Yes | 0.5 | 2.5 | 8 mm |

Note:
The magnetic materials comprised a ferromagnetic metal powder having an Fe/Al ratio of 100 to 5, an Hc of 1580 Oe, an δs of 120 emu/g and a BET specific surface area of 56 m$^2$/g for magnetic material I, a hexagonal barium ferrite for magnetic material II and a Co-containing γ-Fe$_2$O$_3$ iron oxide having an Hc of 800 Oe and a BET of 50 m$^2$/g for magnetic material III.

TABLE 3

| | Lower layer Fe$^{2+}$/Fe$^{3+}$ ratio | RF output (dB) | Luminescent S/N (dB) | Chromatic output (dB) | Chromatic S/N (dB) | Running test | Flaws on the base surface | Light transmittance (%) | Back face resistivity (Ω-cm) |
|---|---|---|---|---|---|---|---|---|---|
| Example 1 | 0.15 | 1.7 | 1.1 | 2.8 | 0.8 | o | A | 0.8 | 2 × 10$^9$ |
| Example 2 | 0.15 | 1.6 | 1.0 | 2.6 | 0.7 | o | A | 0.8 | 2 × 10$^9$ |
| Example 3 | 0.15 | 1.9 | 1.3 | 2.9 | 1.0 | o | B | 0.8 | 2 × 10$^9$ |
| Example 4 | 0.15 | 1.8 | 1.3 | 2.9 | 1.0 | o | B | 0.8 | 2 × 10$^9$ |
| Example 5 | 0.15 | 1.2 | 0.7 | 2.6 | 0.6 | o | A | 0.8 | 2 × 10$^9$ |
| Example 6 | 0.10 | 1.5 | 0.9 | 2.6 | 0.7 | o | A | 1.5 | 1 × 10$^{10}$ |
| Example 7 | 0.28 | 1.9 | 1.3 | 3.1 | 0.9 | o | A | 0.4 | 5 × 10$^8$ |
| Example 8 | 0.45 | 2.1 | 1.6 | 3.4 | 1.0 | o | A | 0.2 | 1 × 10$^8$ |
| Example 9 | 0.15 | 4.0 | 3.9 | 2.9 | 1.5 | o | A | 0.8 | 2 × 10$^9$ |
| Example 10 | 0.15 | 3.2 | 3.0 | 2.8 | 1.8 | o | A | 0.8 | 2 × 10$^9$ |
| Comparative Example 1 | 0.15 | 1.8 | 1.3 | 3.0 | 0.9 | Δ | C | 0.8 | 2 × 10$^9$ |

TABLE 3-continued

| | Lower layer $Fe^{2+}/Fe^{3+}$ ratio | RF output (dB) | Luminescent S/N (dB) | Chromatic output (dB) | Chromatic S/N (dB) | Running test | Flaws on the base surface | Light transmittance (%) | Back face resistivity ($\Omega$-cm) |
|---|---|---|---|---|---|---|---|---|---|
| Comparative Example 2 | 0.15 | 1.8 | 1.2 | 2.9 | 0.8 | Δ | C | 0.8 | $2 \times 10^9$ |
| Comparative Example 3 | 0.15 | 1.1 | 0.9 | 2.5 | 0.6 | o | D | 0.8 | $2 \times 10^9$ |
| Comparative Example 4 | 0.15 | 1.0 | 0.7 | 2.4 | 0.5 | o | D | 0.8 | $2 \times 10^9$ |
| Example 11 | 0.03 | 1.7 | 1.1 | 2.7 | 0.7 | o | C | 2.7 | $1 \times 10^{11}$ |
| Example 12 | 0.08 | 1.8 | 1.2 | 2.8 | 0.8 | o | C | 2.2 | $1 \times 10^{10}$ |
| Example 13 | 0.15 | 1.9 | 1.4 | 2.9 | 1.1 | o | B | 0.8 | $2 \times 10^9$ |
| Example 14 | 0.15 | 1.8 | 1.3 | 2.8 | 1.1 | o | A | 0.8 | $2 \times 10^9$ |
| Example 15 | 0.15 | 1.8 | 1.3 | 2.9 | 1.0 | o | A | 0.8 | $2 \times 10^9$ |
| Example 16 | 0.15 | 1.1 | 0.7 | 2.5 | 0.5 | o | A | 0.8 | $2 \times 10^9$ |
| Comparative Example 5 | 0.15 | 4.1 | 4.0 | 3.0 | 1.7 | Δ | C | 0.8 | $2 \times 10^9$ |
| Comparative Example 6 | 0.15 | 3.3 | 3.1 | 2.9 | 1.9 | Δ | C | 0.8 | $2 \times 10^9$ |
| Comparative Example 7 | — | 1.7 | 1.2 | 0.2 | 0.8 | Δ | C | 2.3 | $1 \times 10^{11}$ |
| Comparative Example 8 | — | 4.1 | 4.0 | −0.8 | 1.0 | Δ | C | 3.5 | $2 \times 10^{12}$ |
| Comparative Example 9 | — | 3.2 | 3.1 | 0.4 | 1.7 | Δ | C | 3.6 | $2 \times 10^{12}$ |
| Comparative Example 10 | — | 1.7 | 1.1 | 0.1 | 0.7 | o | A | 2.3 | $1 \times 10^{11}$ |
| Comparative Example 11 | — | 4.1 | 3.9 | −0.9 | 0.9 | o | A | 3.5 | $2 \times 10^{12}$ |
| Comparative Example 12 | — | 3.0 | 2.9 | 0.3 | 1.6 | o | A | 3.6 | $2 \times 10^{12}$ |
| Comparative Example 13 | 0.15 | 1.7 | 1.1 | 2.8 | 0.7 | Δ | C | 0.8 | $2 \times 10^9$ |
| Comparative Example 14 | 0.15 | 1.2 | 0.8 | 2.4 | 0.1 | Δ | A | 0.8 | $2 \times 10^9$ |

These results demonstrate that a magnetic recording medium showing generally excellent performance can be obtained by providing two magnetic layers and controlling the distribution and size of the protrusions on the base support's back face according to the present invention.

Next, magnetic recording media having three magnetic layers 2, 5 and 6 as illustrated in FIG. 2 and as directed in Tables 4 through 6 were prepared, and their performance was evaluated in the same manner as above. The results obtained are shown in Table 6, demonstrating that a satisfactory performance is obtained with the configuration of the invention like in the case of two magnetic layers.

TABLE 5

| | Magnetic material for upper layer | Upper layer thickness (μm) | Interlayer thickness (μm) | Lower layer thickness (μm) | Cutting width |
|---|---|---|---|---|---|
| Examples 17 | (I) | 0.3 | 0.3 | 2.5 | 8 mm |
| Examples 18 | (I) | 0.3 | 0.3 | 2.5 | ½ inch |

Note:
The magnetic material for the interlayer comprised a Co-containing $\gamma$-$Fe_2O_3$ having an Hc of 800 Oe and a BET of 50 m$^2$/g. The magnetic materials for the upper and lower layers were the same as those used in the upper and lower layers described above.

TABLE 6

| | Lower layer $Fe^{2+}/Fe^{3+}$ ratio | RF output (dB) | Luminescent S/N (dB) | Chromatic output (dB) | Chromatic S/N (dB) | Running test | Flaws on the base surface | Light transmittance (%) | Back face resistivity ($\Omega$-cm) |
|---|---|---|---|---|---|---|---|---|---|
| Example 17 | 0.15 | 1.7 | 1.2 | 2.8 | 0.9 | o | A | 0.9 | $5 \times 10^7$ |
| Example 18 | 0.15 | 4.1 | 4.0 | 3.0 | 1.6 | o | A | 0.9 | $5 \times 10^7$ |

Example 2

Preparation of lower layer coating solution 20 parts of a carbon black having an average grain size of 20 mμ and an oil absorption rate of 115 ml/100 g

TABLE 4

| | Number of protrusions having a height of not less than 0.01 μm (per mm) | Average height of protrusions (μm) | Maximum height of protrusions (μm) | Maximum height of protrusions/ average height of protrusions | Number of protrusions having a height of not less than 0.30 μm (per 400 mm) |
|---|---|---|---|---|---|
| Examples 17 | 457 | 0.090 | 0.225 | 2.5 | 0 |
| Examples 18 | 625 | 0.045 | 0.20 | 4.4 | 0 | commercially available under trade name Conductex-SC and 15 parts of a polyurethane containing sodium sulfonate commercially available under trade name UR-8300 from Toyobo Ltd., together with a small amount of solvent, were kneaded in a kneader. After diluting the mixture with solvent to a viscosity of 10 to 50 centipoise, the components were dispersed using a sand mill, after which 5 parts of polyisocyanate (Coronate L, produced by Nippon Polyurethane Industry Co., Ltd.; the same applies below) was added to yield a coating solution.

An upper layer coating solution was prepared in the same manner as in Example 1.

TABLE 7

| | Number of protrusions having a height of not less than 0.01 μm (per mm) | Average height of protrusions (μm) | Maximum height of protrusions (μm) | Maximum height of protrusions/ average height of protrusions | Number of protrusions having a height of not less than 0.30 μm (per 400 mm) |
|---|---|---|---|---|---|
| Examples 19, 24, 25, 30, 31, Comparative Examples 26, 27 | 475 | 0.090 | 0.225 | 2.5 | 0 |
| Example 20 | 625 | 0.045 | 0.20 | 4.4 | 0 |
| Example 21 | 250 | 0.090 | 0.20 | 2.2 | 0 |
| Example 22 | 250 | 0.155 | 0.25 | 1.6 | 0 |
| Example 23 | 500 | 0.091 | 0.40 | 4.4 | 450 |
| Example 24 | 200 | 0.090 | 0.20 | 2.2 | 0 |
| Example 25 | 475 | 0.20 | 0.25 | 1.25 | 0 |
| Example 26 | 475 | 0.090 | 0.45 | 5.0 | 0 |
| Example 27 | 475 | 0.091 | 0.40 | 4.4 | 500 |
| Comparative Examples 15, 19 through 23 | 150 | 0.090 | 0.225 | 2.5 | 0 |
| Comparative Example 16 | 200 | 0.221 | 0.28 | 1.3 | 0 |
| Comparative Example 17 | 400 | 0.090 | 0.55 | 5.6 | 520 |
| Comparative Example 18 | 475 | 0.090 | 0.55 | 5.6 | 1520 |
| Comparative Example 24 | 180 | 0.090 | 0.225 | 2.5 | 0 |
| Comparative Example 25 | 400 | 0.210 | 0.28 | 1.3 | 0 |

TABLE 8

| | Magnetic material for upper layer | Presence or absence of lower layer | Upper layer thickness (μm) | Lower layer thickness (μm) | Cutting width |
|---|---|---|---|---|---|
| Examples 19 through 23, 30 and 31 | (I) | Yes | 0.7 | 2.3 | 8 mm |
| Example 24 | (II) | Yes | 0.7 | 2.3 | ½ inch |
| Example 25 | (III) | Yes | 0.7 | 2.3 | ½ inch |
| Examples 26 through 29 | (I) | Yes | 0.7 | 2.3 | 8 mm |
| Comparative Examples 15 through 18, 26, 27 | (I) | Yes | 0.7 | 2.3 | 8 mm |
| Comparative Example 19 | (II) | Yes | 0.7 | 2.3 | ½ inch |
| Comparative Example 20 | (III) | Yes | 0.7 | 2.3 | ½ inch |
| Comparative Example 21 | (I) | No | 3.0 | — | 8 mm |
| Comparative Example 22 | (II) | No | 3.0 | — | ½ inch |
| Comparative Example 23 | (III) | No | 3.0 | — | ½ inch |
| Comparative Examples 24 and 25 | (I) | Yes | 0.7 | 2.3 | 8 mm |

Note:
The magnetic materials comprised a ferromagnetic metal powder having an Fe/Al ratio of 100 to 5, an Hc of 1580 Oe, an δs of 120 emu/g and a BET specific surface area of 56 m²/g for magnetic material I, a hexagonal barium ferrite for magnetic material II and a Co-containing γ-Fe₂O₃ iron oxide having an Hc of 800 Oe and a BET of 50 m²/g for magnetic material III. The amount of carbon black in the lower layer was 10 parts for Example 12, 80 parts for Example 13, 1 part (the amount of carbon black in the upper layer was 5 parts per 100 parts of magnetic powder) for Comparative Example 12 and 95 parts for Comparative Example 13.

TABLE 9

| | RF output (dB) | Luminescent S/N (dB) | Chromatic output (dB) | Chromatic S/N (dB) | Running test | Flaws on the base surface |
|---|---|---|---|---|---|---|
| Example 19 | 1.6 | 1.1 | 0.2 | 0.7 | o | A |
| Example 20 | 1.4 | 1.0 | 0.1 | 0.6 | o | A |
| Example 21 | 1.8 | 1.3 | 0.3 | 0.9 | o | B |

TABLE 9-continued

| | RF output (dB) | Luminescent S/N (dB) | Chromatic output (dB) | Chromatic S/N (dB) | Running test | Flaws on the base surface |
|---|---|---|---|---|---|---|
| Example 22 | 1.7 | 1.3 | 0.2 | 0.8 | o | B |
| Example 23 | 1.3 | 0.8 | 0 | 0.4 | o | A |
| Example 24 | 4.1 | 3.8 | −1.5 | −0.1 | o | A |
| Example 25 | 3.0 | 2.8 | 0.1 | 1.7 | o | A |
| Comparative Example 15 | 1.9 | 1.3 | 0.4 | 0.9 | Δ | C |
| Comparative Example 16 | 1.8 | 1.1 | 0.3 | 0.7 | Δ | C |
| Comparative Example 17 | 1.2 | 0.6 | 0 | 0.1 | o | D |
| Comparative Example 18 | 1.1 | 0.5 | −0.2 | 0.1 | o | D |
| Example 26 | 1.7 | 1.2 | 0.3 | 0.8 | o | B |
| Example 27 | 1.2 | 0.9 | 0 | 0.4 | o | A |
| Example 28 | 1.6 | 1.0 | 0.2 | 0.6 | o | A |
| Example 29 | 1.5 | 1.0 | 0.1 | 0.7 | o | A |
| Example 30 | 1.6 | 1.1 | 0.1 | 0.7 | o | A |
| Example 31 | 1.5 | 1.1 | 0.2 | 0.7 | o | A |
| Comparative Example 19 | 4.3 | 4.0 | −1.3 | 0.2 | Δ | C |
| Comparative Example 20 | 3.1 | 2.8 | 0.2 | 1.9 | Δ | C |
| Comparative Example 21 | −0.2 | −0.3 | −0.6 | −1.5 | Δ | C |
| Comparative Example 22 | 1.5 | 1.3 | −1.9 | −1.8 | Δ | C |
| Comparative Example 23 | 1.4 | 1.4 | −0.1 | 0.6 | Δ | C |
| Comparative Example 24 | 1.5 | 1.0 | 0.1 | 0.6 | Δ | C |
| Comparative Example 25 | 1.2 | 0.8 | −0.1 | 0.3 | Δ | C |
| Comparative Example 26 | 1.0 | 0.7 | −0.3 | 0.4 | Δ | B |
| Comparative Example 27 | 1.6 | 1.1 | 0.3 | 0.7 | Δ | B |

These results demonstrate that a magnetic recording medium showing generally excellent performance can be obtained by forming a lower layer containing carbon black as the main filler below the upper magnetic layer and controlling the distribution and size of the protrusions on the base support's back face according to the present invention.

Next, two magnetic layers were formed in the same manner as in Example 19 except that the uppermost layer was formed by coating the upper layer coating solution described above and a Co-containing iron oxide having a BET of 30 m²/g and an Hc of 650 Oe was used as a magnetic powder for the lower magnetic layer. In this case, a layer 7 containing carbon black as the main filler prepared with the lower layer coating solution described above, a lower magnetic layer 2 and an uppermost magnetic layer 4 were sequentially coated on the support by the wet-on-wet method as shown in FIG. 5. As for the protrusions on the back face of the support, they were prepared in the same manner as in Example 1. The magnetic material for the uppermost layer is as shown in Table 10. The results are shown in Table 11.

TABLE 10

| | Magnetic material for upper magnetic layer 4 | Thickness of upper magnetic layer 4 (μm) | Thickness of lower magnetic layer 2 (μm) | Thickness of lower layer 7 (μm) | Cutting width |
|---|---|---|---|---|---|
| Example 32 | (I) | 0.5 | 0.5 | 2.0 | 8 mm |
| Example 33 | (II) | 0.5 | 0.5 | 2.0 | ½ inch |
| Example 34 | (III) | 0.5 | 0.5 | 2.0 | ½ inch |

TABLE 11

| | RF output (dB) | Luminescent S/N (dB) | Chromatic output (dB) | Chromatic S/N (dB) | Running test | Flaws on the base surface |
|---|---|---|---|---|---|---|
| Example 32 | 1.6 | 1.2 | 2.0 | 1.3 | o | A |
| Example 33 | 4.2 | 3.9 | 2.1 | 0.9 | o | A |
| Example 34 | 3.2 | 2.9 | 2.3 | 1.2 | o | A |

These results demonstrate that the electromagnetic conversion properties and running property are improved by providing two magnetic layers and controlling the distribution and size of the protrusions on the base support's back face.

Next, magnetic layers were formed in the same manner as in Example 1 except that the upper layer was formed by coating the upper layer coating solution described above and a Co-containing iron oxide having a BET of 30 m²/g and an Hc of 650 Oe was used as a magnetic powder for the lower layer (corresponding to 2 in FIG. 4). In this case, the amount of carbon black in the lower magnetic layer was 15 parts per 100 parts of the magnetic layer composition. The results are shown in Table 12.

TABLE 12

| | RF output (dB) | Lumines- cent S/N (dB) | Chro- matic output (dB) | Chro- matic S/N (dB) | Run- ning test | Flaws on the base surface |
|---|---|---|---|---|---|---|
| Example 35 | 1.4 | 0.9 | 1.5 | 1.0 | o | A |

Next, in Example 33, three magnetic layers, including upper magnetic layers 5 and 6 shown in FIG. 5 and described in Table 13, were formed, and the performance was evaluated in the same manner as above. The results are shown in Table 14, demonstrating that a satisfactory performance is obtained like in the case of two magnetic layers.

TABLE 13

| | Magnetic material for upper layer 6 | Thickness of upper layer 6 (μm) | Thickness of inter- layer 5 (μm) | Thick- ness of lower layer 2 (μm) | Cutting width |
|---|---|---|---|---|---|
| Example 36 | (I) | 0.3 | 0.3 | 2.5 | 8 mm |

Note:
The magnetic material for the interlayer comprised a Co-containing γ-Fe$_2$O$_3$ having an Hc of 800 Oe and a BET of 50 m$^2$/g. The magnetic materials for the upper and lower layers were the same as those used in the upper and lower layers described above.

TABLE 14

| | RF output (dB) | Lumines- cent S/N (dB) | Chro- matic output (dB) | Chro- matic S/N (dB) | Run- ning test | Flaws on the base surface |
|---|---|---|---|---|---|---|
| Example 36 | 1.1 | 0.7 | 2.0 | 1.2 | o | A |

Examples 37 through 45, Comparative Examples 28 through 37

The magnetic layer composition for uppermost layer shown below was kneaded and dispersed for 3 hours using a sand mill to yield a dispersion. To this dispersion was added 5 parts of a polyisocyanate compound Coronate L, produced by Nippon Polyurethane Industry Co., Ltd., and they were mixed in to prepare a magnetic coating solution.

| Magnetic layer composition for uppermost layer | |
|---|---|
| Co-containing γ-Fe$_2$O$_3$ ferromagnetic fine powder (Hc = 800 Oe, BET = 50 m$^2$/g, average major axis length = 0.2 μm) | 100 parts |
| Vinyl chloride resin containing metal salt of sulfonic acid (MR110, produced by Nippon Zeon Co., Ltd.) | 10 parts |
| Polyester polyurethane resin (XE-1, produced by Takeda Chemical Industries, Ltd.) | 5 parts |
| α-Al$_2$O$_3$ (average grain size = 0.2 mμ) | 5 parts |
| Carbon black (average primary grain size 40 μm) | 1 part |
| Myristic acid | 1 part |
| Stearic acid | 1 part |
| Butyl stearate | 1 part |
| Methyl ethyl ketone | 100 parts |
| Cyclohexanone | 100 parts |
| Toluene | 100 parts |

The following compositions for lower layer B through E were each thoroughly kneaded and dispersed in the same manner as above to yield lower layer coating solutions B through E.

| Composition B for lower layer | |
|---|---|
| Co-γ-Fe$_2$O$_3$ powder (Hc = 700 Oe, BET = 40 m$^2$/g, average axis length = 0.25 μm) | 100 parts |
| Vinyl chloride resin containing metal salt of sulfonic acid (MR110, produced by Nippon Zeon Co., Ltd.) | 10 parts |
| Polyester polyurethane resin (XE-1, produced by Takeda Chemical Industries, Ltd.) | 5 parts |
| Carbon black (average primary grain size = 20 μm) | 5 parts |
| Stearic acid | 1 part |
| Myristic acid | 1 part |
| Butyl stearate | 1 part |
| Cyclohexanone | 80 parts |
| Methyl ethyl ketone | 80 parts |
| Toluene | 80 parts |

Composition B (1) for lower layer

The same as the composition B for lower layer except that the amount of carbon black added was changed to 1 part.

Composition B (2) for lower layer

The same as the composition B for lower layer except that the amount of carbon black added was changed to 0.5 part.

| Composition C for lower layer | |
|---|---|
| CrO$_2$ powder (Hc = 700 Oe, BET = 30 m$^2$/g) | 100 parts |
| Vinyl chloride resin containing metal salt of sulfonic acid (MR110, produced by Nippon Zeon Co., Ltd.) | 10 parts |
| Polyester polyurethane resin (XE-1, produced by Takeda Chemical Industries, Ltd.) | 5 parts |
| Stearic acid | 1 part |
| Myristic acid | 1 part |
| Butyl stearate | 1 part |
| Cyclohexanone | 100 parts |
| Methyl ethyl ketone | 100 parts |
| Toluene | 100 parts |
| Composition D for lower layer | |
| SnO$_2$ powder (average grain size 0.5 μm) | 10 parts |
| Polyester containing sodium sulfonate (Vylon 530, produced by Toyobo Co., Ltd.) | 10 parts |
| Methyl ethyl ketone | 100 parts |
| Toluene | 100 parts |
| Composition E for lower layer | |
| Carbon black (average primary grain size = 20 μm) | 10 parts |
| Polyester containing sodium sulfonate (Vylon 530, produced by Toyobo Co., Ltd.) | 10 parts |
| Methyl ethyl ketone | 100 parts |
| Toluene | 100 parts |

The various coating solutions thus obtained were appropriately combined as shown in Table 15 and coated and dried on a polyethylene terephthalate film of 14 μm in thickness having particular protrusions and surface undulations to yield magnetic layers with a double layer structure (Examples 37 through 45 and Comparative Examples 30 through 37) or a single layer structure (Comparative Examples 28 and 29) to the thicknesses shown in Table 15.

Of the magnetic layers thus obtained, those having a single layer structure were formed by an ordinary coating method, while those having a double layer structure were formed as illustrated in FIG. 10.

First, the non-magnetic support (polyethylene terephthalate film) 5, wound back from the supply roll 4, is double coated with the coating solutions for the lower and upper layers by the wet-on-wet method using the extrusion coaters 6 and 7 each having a liquid reservoir 6a or 7a, respectively, after which it is passed by the first orientation magnet 8 and is introduced to the dryer 10 equipped with the second orientation magnet 9, where it is dried by hot blow from the upper and lower nozzles.

The polyethylene terephthalate film 5 having magnetic layers thus dried is transported to the supercalenderer 12 which comprises a combination of calender rolls 11, where it is calendered and then wound up on the winding roll 13.

The wide magnetic recording media having a magnetic layer with a double or single layer structure were each slitted to a width of half inch to yield video tapes.

Various properties of these video tapes were determined.

The results are shown in Tables 15 and 16.
The properties were determined as follows:

(a) Surface undulation on magnetic layer (A) and surface undulation on the magnetic layer side of non-magnetic support (B)

The average undulation on the wave filter center line was determined using a tarry step surface ruggedness tester produced by Tailor-Hobson Company under the following measuring conditions:

| Measuring length: | 1 mm |
| Probe speed: | 0.1 mm/sec |
| Cutoff value: | 2 Hz |

(b) Number and height of protrusions on the magnetic layer side of non-magnetic support A surface ruggedness curve was drawn using a tarry step surface ruggedness tester produced by Tailor-Hobson Company. With respect to the protrusions recognized with this curve as a peak (protrusions exceeding the peak count value), the height from the average line was measured, and the protrusions having a height of not less than 0.010 μm and those having a height of not less than 0.30 μm were counted under the following conditions:

| Measuring length: | 1 mm |
| Cutoff value: (high pass filter) | 0.33 Hz |
| Peak count value: | 0.005 μm |

For the protrusions having a height of not less than 0.30 μm, their number was obtained per 400 cycles of the measurement described above since the frequency of their occurrence was low.

(c) RF output, luminescent S/N, chromatic output and chromatic S/N

Determined using a Shibasoku 925 D/1 color video noise meter on an HR-S7000 deck, produced by Victor Company of Japan. Results are expressed in values relative to the figures obtained with the reference tape in dB unit. The frequencies of the respective signals are as follows:

| RF-output | 6 MHz |
| Luminescent S/N | 6 MHz |
| Chromatic S/N | 629 KHz |
| Chromatic output | 629 KHz |

(d) Surface resistivity

Determined using a surface electrometer.

(e) Drop-out

Full-length determination was made using a drop-out counter VD-5M, produced by Victor Company of Japan, for the outputs which prolonged for not less than 15 μsec and which showed a reduction of not less than 20 dB in RF envelope output, and the average value per minute was calculated.

(f) Head wear

Full-length running of the tape sample was repeated on an HR-S5000 deck, produced by Victor Company of Japan, at a temperature of 40° C. and a relative humidity of 80% for 100 hours, and the amount of head wear was measured before and after running.

(g) Head turbidity

1) The 6 MHz signal was recorded at a temperature of 20° C. and a relative humidity of 65% for 10 minutes, and reproduction was repeated three times.

2) The 8 MHz signal was recorded at a temperature of 20° C. and a relative humidity of 65% for 2 minutes, and the reproduced output was measured using a spectrum analyzer (measurement A).

3) The tape sample was subjected to full-length run at a temperature of 20° C. and a relative humidity of 20%.

4) The 8 MHz signal was recorded at a temperature of, 20° C. and a relative humidity of 20% for 2 minutes, and the reproduced output was measured using a spectrum analyzer (measurement B).

5) The difference between the measurements A and B (A-B) was calculated as an index of output reduction. The head was examined for turbidity and evaluated in the following three grades:

◯: No turbidity on the glass portion of head.
△: Turbidity covers about half the surface of the glass portion of head.
x: Turbidity covers the entire surface of the glass portion of head.

(h) Sliding noise

1) Reproduction was conducted without being preceded by running the tape, and the system noise was measured using a spectrum analyzer.

2) The tape sample was subjected to 10 cycles of reproduction for 1 minute, and the sliding noise was measured using a spectrum analyzer.

3) With respect to the noise level near 8 MHz, the average value of noise for 10 passes was obtained in comparison with the system noise (0 dB). The measuring conditions were as follows:

| Temperature | 20° C. |
| Relative humidity | 10% |
| Deck | HR-S7000, produced by Victor Company of Japan. |

TABLE 15

| | Layer configuration | | Magnetic layer surface undulation (μm) | Surface undulation on the magnetic layer side of non-magnetic support (μm) | Number of protrusions exceeding 0.01 μm in height on the magnetic layer side of non-magnetic support (per mm) | Ratio of maximum protrusion height/ average protrusion height on the magnetic layer side of non-magnetic support | Number of protrusions exceeding 0.30 μm in height on the magnetic layer side of non-magnetic support (per 400 mm) | Average protrusion height on the magnetic layer side of non-magnetic support (μm) |
|---|---|---|---|---|---|---|---|---|
| | Coating solution (kind) upper/ lower | Thickness (μm) upper/ lower | | | | | | |
| Example 37 | A/B | 1.0/2.5 | 0.012 | 0.010 | 500 | 4.3 | 0 | 0.030 |
| Example 38 | A/B | 1.0/2.5 | 0.013 | 0.011 | 380 | 3.4 | 100 | 0.060 |
| Example 39 | A/B | 1.0/2.5 | 0.012 | 0.011 | 530 | 5.0 | 0 | 0.020 |
| Example 40 | A/B | 1.0/2.5 | 0.010 | 0.010 | 430 | 1.9 | 0 | 0.140 |
| Example 41 | A/B | 0.5/3.0 | 0.012 | 0.010 | 540 | 4.3 | 0 | 0.033 |
| Example 42 | A/C | 1.0/2.5 | 0.012 | 0.010 | 520 | 4.4 | 0 | 0.032 |
| Example 43 | A/C | 0.5/3.0 | 0.012 | 0.010 | 570 | 4.4 | 0 | 0.035 |
| Example 44 | A/D | 1.0/2.5 | 0.012 | 0.010 | 590 | 4.3 | 0 | 0.037 |
| Example 45 | A/E | 1.0/2.5 | 0.012 | 0.010 | 510 | 4.3 | 0 | 0.031 |
| Comparative Example 28 | A/— | 3.5/— | 0.012 | 0.010 | 480 | 4.2 | 0 | 0.029 |
| Comparative Example 29 | A/— | 3.5/— | 0.023 | 0.021 | 500 | 4.1 | 23 | 0.062 |
| Comparative Example 30 | A/B | 1.0/2.5 | 0.023 | 0.021 | 520 | 4.0 | 25 | 0.063 |
| Comparative Example 31 | A/B(1) | 1.0/2.5 | 0.023 | 0.021 | 510 | 4.0 | 23 | 0.062 |
| Comparative Example 32 | A/B(2) | 1.0/2.5 | 0.023 | 0.021 | 500 | 3.9 | 21 | 0.061 |
| Comparative Example 33 | A/B | 1.0/2.5 | 0.015 | 0.011 | 500 | 5.5 | 630 | 0.060 |
| Comparative Example 34 | A/B | 1.0/2.5 | 0.012 | 0.010 | 500 | 11.5 | 510 | 0.030 |
| Comparative Example 35 | A/B | 1.0/2.5 | 0.012 | 0.013 | 250 | 3.9 | 1150 | 0.230 |
| Comparative Example 36 | A/B | 1.0/2.5 | 0.010 | 0.009 | 50 | 8.3 | 0 | 0.005 |
| Comparative Example 37 | A/B | 1.0/2.5 | 0.010 | 0.009 | 50 | 40.5 | 0 | 0.005 |

TABLE 16

| | Electromagnetic conversion properties | | | | Surface resistivity (Ω/sq) | Drop-out (number/min) | Head wear (μm) | Head turbidity | Sliding noise (dB) |
|---|---|---|---|---|---|---|---|---|---|
| | RF output (dB) | Luminescent S/N (dB) | Chromatic output (dB) | Chromatic S/N (dB) | | | | | |
| Example 37 | 0.8 | 0.7 | 0.6 | 2.0 | $1.0 \times 10^8$ | 5 | 4 | o | 0.6 |
| Example 38 | 0.8 | 0.7 | 0.5 | 1.8 | $1.1 \times 10^8$ | 5 | 3 | o | 1.0 |
| Example 39 | 0.8 | 0.8 | 0.8 | 2.2 | $1.0 \times 10^8$ | 5 | 5 | o | 0.5 |
| Example 40 | 0.9 | 1.0 | 0.6 | 2.5 | $1.0 \times 10^8$ | 5 | 2 | o | 0.8 |
| Example 41 | 0.8 | 0.7 | 1.0 | 2.8 | $7.0 \times 10^7$ | 3 | 4 | o | 0.4 |
| Example 42 | 0.8 | 0.7 | 0.7 | 2.3 | $9.0 \times 10^8$ | 12 | 4 | o | 0.5 |
| Example 43 | 0.8 | 0.6 | 1.2 | 3.0 | $3.0 \times 10^8$ | 7 | 4 | o | 0.3 |
| Example 44 | 0.8 | 0.6 | 0.6 | 2.1 | $8.0 \times 10^7$ | 4 | 4 | o | 0.2 |
| Example 45 | 0.8 | 0.6 | 0.4 | 1.7 | $2.0 \times 10^7$ | 2 | 4 | o | 0.6 |
| Comparative Example 28 | 0.8 | 0.7 | 0.4 | 0.3 | $1.0 \times 10^{12}$ | 150 | 4 | o | 1.6 |
| Comparative Example 29 | 0 | 0 | 0 | 0 | $1.1 \times 10^{12}$ | 140 | 4 | o | 1.3 |
| Comparative Example 30 | −0.1 | −0.3 | 0.2 | 0.1 | $1.0 \times 10^8$ | 6 | 4 | o | 0.7 |
| Comparative Example 31 | 0 | −0.1 | 0.2 | 0.1 | $8.0 \times 10^9$ | 30 | 4 | o | 0.8 |
| Comparative Example 32 | 0 | −0.1 | 0.2 | 0.1 | $3.0 \times 10^{11}$ | 70 | 3 | o | 0.9 |
| Comparative Example 33 | 0.2 | 0.2 | 0.4 | 0.1 | $1.0 \times 10^8$ | 5 | 6 | o | 0.8 |
| Comparative Example 34 | 0.8 | 0.7 | 0.4 | 0 | $1.0 \times 10^8$ | 5 | 15 | o | 0.8 |
| Comparative Example 35 | 0.5 | 0.4 | 0.3 | −0.2 | $1.0 \times 10^8$ | 6 | 3 | Δ | 2.4 |
| Comparative Example 36 | 0.8 | 0.7 | 0.6 | 1.8 | $1.0 \times 10^9$ | 6 | 10 | x | 5.7 |
| Comparative Example 37 | 0.8 | 0.7 | 0.5 | 1.5 | $1.0 \times 10^9$ | 6 | 20 | x | 4.9 |

Examples 46 through 52, Comparative Examples 28 through 35

The magnetic layer compositions A and A' for upper layer shown below were kneaded and dispersed for 3 hours using a sand mill to yield dispersions. To each dispersion was added 5 parts of a polyisocyanate compound Coronate L, produced by Nippon Polyurethane Industry Co., Ltd., and they were mixed in to prepare magnetic coating solutions A and A'.

| Magnetic layer composition A for uppermost layer | |
|---|---|
| Co-containing $\gamma$-Fe$_2$O$_3$ ferromagnetic fine powder (Hc = 900 Oe, BET = 50 m$^2$/g) | 100 parts |
| Vinyl chloride resin containing potassium sulfonate | 10 parts |
| Polyester polyurethane containing sodium sulfonate | 5 parts |
| Carbon black | 1 part |
| $\alpha$-Al$_2$O$_3$ (average grain size = 0.2 m$\mu$) | 5 parts |
| Myristic acid | 1 part |
| Stearic acid | 1 part |
| Butyl stearate | 1 part |
| Methyl ethyl ketone | 100 parts |
| Cyclohexanone | 100 parts |
| Toluene | 100 parts |

Magnetic layer composition A' for uppermost layer

The same as the magnetic layer composition A for uppermost layer except that carbon black was not added.

The following compositions B and B' for electro-conductive lower layer were treated in the same manner as above to yield dispersions. To each dispersion was added 5 parts of a polyisocyanate compound Coronate L, produced by Nippon Polyurethane Industry Co., Ltd., and they were mixed in to prepare lower layer coating solutions B and B'.

Also, compositions C and D for electro-conductive lower layer were thoroughly kneaded and dispersed in the same manner as above to yield lower layer coating solutions C and D, and a composition for back-coating layer (used solely in Comparative Example 8) was kneaded and dispersed in the same manner as above to yield a back-coating solution.

| Composition B for electro-conductive lower layer | |
|---|---|
| Co-containing $\gamma$-Fe$_2$O$_3$ ferromagnetic fine powder (Hc = 7000 Oe, BET = 30 m$^2$/g) | 100 parts |
| Vinyl chloride resin containing potassium sulfonate | 10 parts |
| Polyester polyurethane containing potassium sulfonate | 5 parts |
| Carbon black | 5 parts |
| Myristic acid | 1 part |
| Stearic acid | 1 part |
| Butyl stearate | 1 part |
| Methyl ethyl ketone | 100 parts |
| Cyclohexanone | 100 parts |
| Toluene | 100 parts |

Composition B' for electro-conductive lower layer

The same as the composition B for electro-conductive lower layer except that carbon black was not added.

| Composition C for electro-conductive lower layer | |
|---|---|
| SnO$_2$ (average grain size 0.7 $\mu$m) | 10 parts |
| Polyester containing sodium sulfonate (Vylon 530, produced by Toyobo Co., Ltd.) | 10 parts |
| Methyl ethyl ketone | 100 parts |
| Toluene | 100 parts |
| Composition D for electro-conductive lower layer | |
| Carbon black | 10 parts |
| Polyester containing sodium sulfonate (Vylon 530, produced by Toyobo Co., Ltd.) | 10 parts |
| Methyl ethyl ketone | 100 parts |

| -continued | |
|---|---|
| Toluene | 100 parts |
| Composition for back-coating layer | |
| Polyurethane resin (Nippolane 2304, produced by Nippon Polyurethane Industry Co., Ltd.) | 40 parts |
| Nitrocellulose (Celnova, produced by Asahi Chemical Industry Co., Ltd.) | 60 parts |
| Polyisocyanate (Coronate L, produced by Nippon Polyurethane Industry Co., Ltd.) | 20 parts |
| Carbon black (average primary grain size = 27 $\mu$m) | 120 parts |
| Toluene | 880 parts |
| Methyl ethyl ketone | 880 parts |

The various coating solutions thus obtained were appropriately combined as shown in Table 17 and coated and dried on the non-magnetic support described below to yield magnetic layers with a double layer structure wherein the upper layer was 0.5 $\mu$m thick and the lower layer was 2.5 $\mu$m thick (Examples 46 through 49 and Comparative Examples 29 through 34), with another double layer structure wherein the upper layer was 2.5 $\mu$m thick and the lower layer was 1.5 $\mu$m thick (Examples 50 through 52) or with a single layer structure (Comparative Examples 28 and 35).

The non-magnetic support used here comprised a polyethylene terephthalate base of 14 $\mu$m in thickness laminated with a polyethylene terephthalate film of 0.2 $\mu$m in thickness on both the faces thereof, having the surface properties shown in Table 17.

In Comparative Example 35, the back-coating solution was coated and dried on the non-magnetic support's face opposite to the magnetic layer side to yield a back-coating layer of 0.9 $\mu$m in thickness.

Of the magnetic layers, those having a single layer structure were formed by an ordinary coating method, while those having a double layer structure were formed as illustrated in FIG. 13.

First, the polyethylene terephthalate film (non-magnetic support) 8, wound back from the supply roll 7, is double coated with the coating solutions for the lower and upper layers by the wet-on-wet method using the extrusion coaters 9 and 10 each having a liquid reservoir 9a or 10a, respectively, after which it is passed by the first orientation magnet 11 and is introduced to the dryer 13 equipped with the second orientation magnet 12, where it is dried by hot blow from the upper and lower nozzles.

The thus-dried polyethylene terephthalate film 2 having a magnetic layer is transported to the super-calenderer 15 which comprises a combination of calender rolls 14, where it is calendered and then wound up on the winding roll 16.

The wide magnetic recording media having a magnetic layer with a double or single layer structure were each slitted to a width of half inch to yield video tapes.

With respect to these video tapes, the surface properties of the non-magnetic support and various tape characteristics were measured.

The results are shown in Tables 17 and 18.

(d) Running property

Full-length running on an HR-S5000 deck, produced by Victor Company of Japan, was repeated at a temperature of 40° C. and a humidity of 80% for 100 hours, after which the tape sample was evaluated with respect to tape edge damage in the following three grades:

◯: No edge damage.
Δ: Edge damage localized in the tape.

x: Edge damage over the entire tape.

(e) Durability

The video tape sample was subjected to 400 cycles of full-length running for 5 minutes on an HR-S7000 deck, produced by Victor Company of Japan. After running, the tape sample was examined for back face flaws and the R/F output reduction was determined. R/F output reduction was determined by comparing the outputs of reproduction of a 100% white signal before and after 400 cycles of running. The back face flaws were visually observed after running and evaluated in the following four grades:.
- A: Almost no back face flaws.
- B: Small number of back face flaws.
- C: Flaws found on the entire back face.
- D: Visible noise on reproduced image.

(f) Transportability

The condition of transport at a line speed of 100 m/min in calendering was visually evaluated for a width of 160 mm in the following three grades:

◯: NO snaking (below 0.5 mm).
Δ: Slight snaking, but no problem (0.5 to 3 mm).
x: Snaking exceeding 3 mm in width.

(g) Drop-out

Full-length determination was made using a drop-out counter VD-5M, produced by Victor Company of Japan, for the outputs which prolonged for not less than 15 μsec and which showed a reduction of not less than 20 dB in RF envelope output, and the average value per minute was calculated.

(h) Surface resistivity

Measured using a surface electrometer at an applied voltage of 500 V.

(i) Light transmittance

Each video tape sample was allowed to run on a VHS deck HR-6500, produced by JVC, and the amount of light transmitted was determined in voltage using the SERVOCORDER SR6312 and converted to light transmittance.

TABLE 17

| | Magnetic layer configuration upper/lower | Interfacial undulation B (μm) | Average protrusion height H on surface I (μm) | Ratio of maximum protrusion height/ average protrusion height on surface I | Number of protrusions exceeding 0.010 μm in height on surface I (per mm) | Number of protrusions exceeding 0.30 μm in height on surface I (per 400 mm) | Average protrusion height H on surface II (μm) | Ratio of maximum protrusion height/ average protrusion height on surface II | Number of protrusions exceeding 0.010 μm in height on surface II (per mm) | Number of protrusions exceeding 0.30 μm in height on surface I (per 400 mm) |
|---|---|---|---|---|---|---|---|---|---|---|
| Example 46 | A/B | 0.010 | 0.08 | 2.0 | 500 | | 0.08 | 2.0 | 500 | |
| Example 47 | A'/B | 0.003 | 0.10 | 2.6 | 620 | 0 | 0.04 | 4.2 | 580 | 0 |
| Example 48 | A'/B | 0.016 | 0.12 | 3.1 | 600 | 67 | 0.12 | 3.1 | 600 | 67 |
| Example 49 | A/B | 0.012 | 0.19 | 2.4 | 330 | 24 | 0.08 | 3.7 | 500 | 9 |
| Example 50 | A/C | 0.010 | 0.08 | 2.0 | 500 | 0 | 0.08 | 2.0 | 500 | 0 |
| Example 51 | A/D | 0.010 | 0.08 | 2.0 | 500 | 0 | 0.08 | 2.0 | 500 | 0 |
| Example 52 | A'/D | 0.010 | 0.08 | 2.0 | 500 | 0 | 0.08 | 2.0 | 500 | 0 |
| Comparative Example 28 | A/— | 0.010 | 0.08 | 2.0 | 500 | 0 | 0.08 | 2.0 | 500 | 0 |
| Comparative Example 29 | A'/B' | 0.010 | 0.08 | 2.0 | 500 | 0 | 0.08 | 2.0 | 500 | 0 |
| Comparative Example 30 | A/B' | 0.012 | 0.29 | 2.0 | 330 | 10,000 | 0.08 | 2.0 | 330 | 10,000 |
| Comparative Example 31 | A/B | 0.024 | 0.09 | 4.4 | 620 | 67 | 0.09 | 4.4 | 620 | 67 |
| Comparative Example 32 | A/B | 0.012 | 0.04 | 11.1 | 600 | 35 | 0.09 | 3.3 | 600 | 7 |
| Comparative Example 33 | A/B | 0.021 | — | — | — | — | 0.09 | 3.3 | 600 | 7 |
| Comparative Example 34 | A/B | 0.021 | 0.09 | 3.3 | 600 | 7 | — | — | — | — |
| Comparative Example 35* | A/— | 0.008 | 0.17 | 1.4 | | | | | | |

*Provided with back-coating layer.

TABLE 18

| | Chromatic AM (dB) | Running test | Back face flaws in durability test | Transportability | Drop-out | Surface resistivity | Light transmittance | Sliding noise |
|---|---|---|---|---|---|---|---|---|
| Example 46 | +1.2 | ◯ | B | ◯ | 2 | $1.5 \times 10^9$ | 0.5 | 1.2 |
| Example 47 | +2.0 | ◯ | A | ◯ | 3 | $1.0 \times 10^{10}$ | 0.6 | 2.0 |
| Example 48 | +0.5 | ◯ | A | ◯ | 3 | $1.0 \times 10^{10}$ | 0.6 | 1.0 |
| Example 49 | +0.8 | ◯ | A | ◯ | 2 | $1.5 \times 10^9$ | 0.5 | 1.2 |
| Example 50 | +1.2 | ◯ | B | ◯ | 3 | $1.8 \times 10^9$ | 0.5 | 1.3 |
| Example 51 | +1.2 | ◯ | B | ◯ | 2 | $1.3 \times 10^8$ | 0.3 | 1.5 |
| Example 52 | +1.2 | ◯ | B | ◯ | 2 | $2.0 \times 10^8$ | 0.4 | 1.5 |
| Comparative Example 28 | +0.5 | ◯ | B | ◯ | 50 | $1.5 \times 10^{12}$ | 0.9 | 2.8 |
| Comparative Example 29 | +1.2 | ◯ | B | ◯ | 20 | $1.5 \times 10^{12}$ | 1.0 | 3.0 |

TABLE 18-continued

|  | Chromatic AM (dB) | Running test | Back face flaws in durability test | Transportability | Drop-out | Surface resistivity | Light trans-mittance | Sliding noise |
| --- | --- | --- | --- | --- | --- | --- | --- | --- |
| Comparative Example 30 | −2.0 | o | C | o | 20 | $1.5 \times 10^{12}$ | 0.8 | 1.5 |
| Comparative Example 31 | −2.5 | o | B | o | 2 | $1.5 \times 10^{9}$ | 0.5 | 1.5 |
| Comparative Example 32 | −1.6 | o | D | o | 2 | $1.5 \times 10^{9}$ | 0.5 | 1.5 |
| Comparative Example 33 | −0.5 | x | D | x | 3 | $1.5 \times 10^{9}$ | 0.5 | 3.5 |
| Comparative Example 34 | −0.5 | x | A | x | 3 | $1.5 \times 10^{9}$ | 0.5 | 3.0 |
| Comparative Example 35 | 0.0 | x | D | x | 5 | $1.8 \times 10^{9}$ | 0.3 | 2.5 |

What is claimed is:

1. A magnetic recording medium comprising;
a non-magnetic support having provided on the same side thereof, at least two layers including an uppermost layer containing a magnetic powder, and at least one layer other than said uppermost layer containing carbon black, wherein
the average height of protrusions on a surface of said support opposite the side of said support on which said at least two layers are provided is 0.01 to 0.20 μm,
the number of protrusions of not less than 0.1 μm in height is not less than 200 per mm of measuring length, the number of protrusions of not less than 0.30 μm in height is not less than 500 per 400 mm of measuring length, and
the maximum height of protrusions divided by the average height of the protrusions is not more than 5.

2. The magnetic recording medium of claim 1, wherein at least one magnetic layer other than the uppermost layer contains iron oxide containing Co, and a ratio of $Fe^{2+}$ and $Fe^{3+}$ is expressed as:

$$0.10 \leq Fe^{2+}/Fe^{3+}.$$

3. The magnetic recording medium of claim 1, wherein the layer containing carbon black contains 10 to 80 wt % of carbon black.

4. The magnetic recording medium of claim 1, wherein the thickness of the uppermost layer is 0.1 to 0.7 μm.

5. The magnetic recording medium of claim 1, wherein the uppermost layer is adjacent to another magnetic layer.

6. The magnetic recording medium of claim 1, wherein the average height of the protrusions is 0.02 to 0.15 μm.

7. The magnetic recording medium of claim 1, wherein the ratio of the maximum height of the protrusions to the average height of the protrusions is less than 3.

8. The magnetic recording medium of claim 1, wherein a layer on an opposite side of said non-magetic support from that on which the magnetic layer is coated, contains no carbon black.

9. The magnetic recording medium of claim 2, wherein the ratio of $Fe^{2+}$ to by $Fe^{3+}$ is 0.13 to 0.45.

10. The magnetic recording medium of claim 3, wherein the layer containing carbon black contains 30 to 60 wt % of carbon black.

11. The magnetic recording medium of claim 6, wherein the average height of the protrusions is 0.05 to 0.1 μm.

* * * * *